US00RE37370B1

(19) United States
(12) Reissued Patent
Cao et al.

(10) Patent Number: US RE37,370 E
(45) Date of Reissued Patent: Sep. 18, 2001

(54) ELECTRICALLY CONDUCTING POLYANILINE: METHOD FOR EMULSION POLYMERIZATION

(75) Inventors: Yong Cao, Goleta, CA (US); Jan-Erik Österholm, Porvoo (FI)

(73) Assignee: Neste Oy, Porvoo (FI)

(21) Appl. No.: 08/808,140

(22) Filed: Feb. 28, 1997

Related U.S. Patent Documents

Reissue of:
(64) Patent No.: 5,324,453
Issued: Jun. 28, 1994
Appl. No.: 07/927,166
Filed: Aug. 7, 1992

(51) Int. Cl.[7] ..... H01B 1/00; H01B 1/06; H01B 1/12

(52) U.S. Cl. ..... 252/500; 252/518; 528/210; 528/212; 528/214; 528/422; 524/457

(58) Field of Search ..... 252/500; 528/210, 528/212, 214, 422, 217; 524/457

(56) References Cited

U.S. PATENT DOCUMENTS

| | | | |
|---|---|---|---|
| 3,963,498 | 6/1976 | Trevoy | 252/501 |
| 4,025,463 | 5/1977 | Trevoy | 252/500 |
| 4,526,706 | 7/1985 | Upson et al. | 252/500 |
| 4,556,623 | 12/1985 | Tamura et al. | 252/500 |
| 4,604,427 | 8/1986 | Roberts et al. | 252/500 |
| 4,731,408 | 3/1988 | Janse | 252/511 |
| 4,759,986 | 7/1988 | Marikar et al. | 428/389 |
| 4,772,421 | 9/1988 | Ikenaga et al. | 252/500 |
| 4,781,971 | 11/1988 | Marikar et al. | 252/506 |
| 4,851,487 | 7/1989 | Yaniger et al. | 252/500 |
| 4,855,361 | 8/1989 | Yaniger et al. | 252/500 |
| 4,893,908 | 1/1990 | Wolf et al. | 350/387 |
| 4,915,985 | 4/1990 | Gould et al. | 252/500 |
| 4,935,163 | 6/1990 | Cameron | 252/500 |
| 4,935,164 | 6/1990 | Wessling et al. | 252/500 |
| 4,963,206 | 10/1990 | Shacklette et al. | 156/99 |
| 4,983,322 | 1/1991 | Eisenbaumer | 252/500 |
| 4,983,690 | 1/1991 | Cameron et al. | 252/500 |
| 5,006,278 | 4/1991 | Eisenbaumer | 252/500 |
| 5,008,041 | 4/1991 | Cameron et al. | 252/500 |
| 5,017,420 | 5/1991 | Marikar et al. | 252/518 |
| 5,069,820 | 12/1991 | Jen et al. | 252/500 |
| 5,079,096 | 1/1992 | Miyake et al. | 252/500 |
| 5,093,439 | 3/1992 | Epstein et al. | 252/500 |
| 5,133,841 | 7/1992 | Higo et al. | 252/500 |
| 5,567,356 | 10/1996 | Kinlen | 252/500 |

FOREIGN PATENT DOCUMENTS

| | | |
|---|---|---|
| 0218284 | 4/1987 | (EP) . |
| 61-195137 | 8/1986 | (JP) . |
| 62-012073 | 1/1987 | (JP) . |
| 62-047109 | 2/1987 | (JP) . |
| 2-240163 | 9/1990 | (JP) . |
| WO89/01694 | 2/1989 | (WO) . |
| WO90/10297 | 9/1990 | (WO) . |
| WO96/14343 | 5/1996 | (WO) . |

OTHER PUBLICATIONS

Andreatta, et al., *Mol. Cryst. Liq. Cryst.* (1990) 189:169–182, (No month).

(List continued on next page.)

*Primary Examiner*—Mark Kopec
(74) *Attorney, Agent, or Firm*—Burns, Doane, Swecker & Mathis LLP

(57) ABSTRACT

A method of emulsion polymerization of aniline or substituted anilines for making substituted or unsubstituted homopolymers and co-polymers of aniline. The method includes formation of an emulsion of aniline monomers, polar solvent, non-polar or weakly polar solvent and functionalized protonic acid, which is selected for its ability to perform two functions: acting as a surfactant and acting as a protonating agent (dopant) in producing an electrically conducting polymer. Then, an oxidant is added to polymerize the ingredients of the emulsion. This method provides polyaniline particles of highly crystalline and oriented morphologies of controlled aspect ratios.

37 Claims, 2 Drawing Sheets

OTHER PUBLICATIONS

Andreatta, et al., *Polymer Comm.* (1990) 31(7):275–278 (No month).
Arjavalinghm, et al., *J. Chem. Phys.* (1990) 93(1):6–9 (Abstract) Jul. 1, 1990.
Cameron, et al., *3rd International SAMPE Electronic Conference* (Jun. 20–22, 1989) pp. 1163–1174.
Chan, et al., *Synth. Metals* (1989) 31(1):95–108 (Abstract) Jul. 1989.
Chan, et al., *Synth. Metals* (1990) 35(3):333–344 (Abstract) Mar. 1990.
Chiang, et al., *Synth. Metals* (1986) 13:193–205, (No month).
Focke, et al., *J. Phys. Chem.* (1987) 91:5813–5818, (No month).
Green et al., *J. Chem Soc.* (1912) 101:1117–1123, (No month).
Kaner et al., *Scientific American* (1988) 258(2):106–111, (No month).
Kobayashi et al., *J. Electroanal. Chem.* (1984) 177:281–2911, (No month).
LaCroix et al., *Makromol. Chem. Makromol. Symp.* (1987) 8:17–37, (No month).
LaCroix et al., *1st International SAMPE Electronics Conference* (Jun. 23–25, 1987) pp. 649–656.
Li et al., *Synth. Metals* (1991) 40:23–28, (No month).
MacDiarmid et al., *Papers from the 6th European Physical Society Industrial Workshop Eur. Phys. Soc.* Loftus, Norway (May 28–31, 1990) (Abstract).
Malhotra et al., *J. Appl. Polymer Sci.* (1990) 40(5–6):10–49–1052, (No month).
Monkman et al., *Synth. Metals* (1991) 40(1):87–96 (Abstract), (No month).
Salaneck et al., *Synth. Metals* (1986) 13:291–297, (No month).
Shacklette et al., *Symposium on Electroresponsive Molecular and Polymeric Systems*, Upton, New York, (Oct. 25–27, 1989) (Abstract).
Theophilou et al., *Electric Properties of Conjugated Polymers III Basic Models and Applications*, Proceedings of an International Winter School, (Mar. 11–18, 1989) Kirchberg, Austria (Abstract).

ELECTRICALLY CONDUCTING POLYANILINE: METHOD FOR EMULSION POLYMERIZATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the chemical synthesis of electrically conducting polymers. In particular, the invention relates to emulsion polymerization of aniline, substituted anilines and mixtures thereof for making substituted or unsubstituted conductive homopolymers and co-polymers of aniline, in the presence of polar and non-polar or weakly polar solvents, and functionalized protonic acids, which perform as surfactants and as protonating agents (dopants) for the resulting electrically conducting polymer. Another aspect of this invention relates to methods for making polyanilines of controlled, highly crystalline and highly oriented morphologies. Yet another aspect relates to methods for making polyanilines of controlled molecular weight.

2. Prior Art

Polymers of aniline, or polyaniline are considered to be attractive as conducting polymers because of excellent stability in comparison with other conjugated polymeric systems. Polyaniline is also of special interest because the electrical properties of polyaniline can be reversibly controlled both by charge-transfer doping and by protonation. Thus, a wide range of associated electrical, electrochemical, and optical properties, coupled with excellent environmental stability, make polyaniline a useful electronic material in a wide variety of technologically important applications. Disclosures of polyaniline and its use can be found in numerous publications and patents. Green, A. G., and Woodhead, A. E., "Aniline-black and Allied Compounds, Part 1," J. Chem. Soc. 101 (1912) 1117; Kobayashi, et al., "Electrochemical Reactions . . . of Polyaniline Film-Coated Electrodes," J. Electroanal. Chem., 177 (1984) 281–91; and U.S. Pat. Nos. 3,963,498; 4,025,463 and 4983,322.

Polyaniline can be synthesized from monomers by both electrochemical and chemicals oxidative polymerization methods. Electrochemical oxidation utilizes an electrochemical charge transfer reaction, whereas chemical oxidation occurs by means of chemical reaction with an appropriate oxidizing agent. Considerable effort has been devoted to development of relationships between the synthetic conditions for electrochemical polymerization and the resulting properties of polyanilines (W.-S. Huang, B. D. Humphrey, A. G. MacDiarmid, J. Chem. Soc. Faraday Trans., 82 (1986) 2385; E. M. Genies, A. A. Syed, C. Tsintavis, Mol. Cryst. Liq. Cryst., 121 (1985) 181).

The chemical oxidative polymerization of anilines is particularly important since this mode of synthesis is the most feasible for large-scale production of polyaniline. The chemical oxidative polymerization of aniline routinely is carried out in acidic aqueous solutions. Recently, Pron et al. (A. Pron, F. Genoud, C. Mernardo, M. Nechtschein, Synth. Metals, 24 (1988) 193) compared the electrical conductivity and the reaction yield of polyaniline, polymerized with four different oxidizing agents and at different aniline/oxidant ratios. These authors concluded that the redox potential of the oxidizing agents is not a dominant parameter in the aqueous chemical polymerization of aniline, because most oxidizing agents gave similar results. Cao et al. (Y. Cao, A. Andreatta, A. J. Heeger, P. Smith, Polymer, 30 (1989) 2305) determined optimal reaction conditions for the chemical polymerization of aniline in acidic aqueous solutions as a function of a wide variety of synthesis parameters, such as pH, relative concentration of reactants, polymerization temperature and time. Armes et al. (S. P. Armes, J. F. Miller, Synth. Metals, 22 (1988) 385) studied the polymerization of aniline at 20° C. using ammonium peroxysulfate as oxidant. In their study of the effect of the initial oxidant/monomer molar ratio. Armes et al. concluded that the conductivity, yield, elemental composition and degree of oxidation of the resulting polyaniline are essentially independent of the initial oxidant/monomer molar ratio when its value was below 1.15. Asturias et al. (G. E. Asturias, A. G. MacDiarmid, A. J. Epstein, ICSM '88, Synth. Metals, 29 (1989) E157) investigated the influence of the polymerization atmosphere (air or argon) on the degree of oxidation of chemically prepared polyaniline, using $(NH_4)_2S_2O_8$ as an oxidant in acidic aqueous solutions.

Traditionally, and in the above cited references, aniline is chemically polymerized in an aqueous medium to which an oxidant is added. Sometimes, in addition to the above ingredients, a protonic acid is added to the aqueous polymerization mixture that renders the final polyaniline conductive (A. G. MacDiarmid, J.-C. Chiang, W. Huang, B. D. Humphry, N. L. D. Somasiri, Mol. Cryst. Liq. Cryst. 125 (1985) 309–318; J.-C. Chiang, A. G. McDiarmid, Synth. Metals, 13 (1986) 193–205; W. W. Kocke, G. E. Wnekand Y. Wei., J. Phys. Chem. (1987) 5813–5818; Jap. Pat. No. 63-178442, U.S. Pat. No. 5,069,820).

A number of technological disadvantages are associated with the currently employed acidic aqueous chemical synthesis. Generally, under the chemical polymerization conditions described in the above references, the polymer is obtained in irregular, powdrous form having moderate degrees of crystallinity and lacking macroscopic molecular orientation. The shape of the precipitating polyaniline particles commonly is difficult to control, and most often is globular, and not fibrillar. The formation of fibrillar polyaniline particles in acidic aqueous chemical polymerizations has been disclosed, but only in polymerizations to which additional polymeric species, such as poly(ethyleneoxide) or poly(acrylic acid) have been added (B. Vincent, J. Waterson, J. Chem. Soc. Chem. Commun. (1990) 683; J.-M. Siu, S. C. Yang, J. Chem. Soc., Chem. Commun. (1991) 1529. These methods include the addition of polymers to the aniline polymerization, which is uneconomical, and may have unwanted effects. For example, the addition of poly (ethyleneoxide) results in materials of low thermal stability which is undesirable in many applications. Therefore, the added poly(ethyleneoxide) may have to be removed.

Generally, the formation of fibrillar morphologies are highly desirable in conductive polymers, because such "whiskers" may have enhanced order and superior electrical conductivity over randomly oriented and less crystalline polyaniline particles. In addition, a high length/diameter ratio (known as the aspect ratio) of conducting particles, generally, is of extreme importance in lowering the percolation threshold of electrical conductivity (the minimum % v/v of electrically conductive material in total material at which the material conducts electricity) in blends with non-conducting polymers. This is a major economic advantage. For example, when spherical conductive particles are added to an insulating matrix, a volume fraction of spherical particles greater than about 0.17 is required to impart electrical conductivity to the composition. By contrast, when whisker- or fibril-shaped conductive particles are added to an insulating matrix, the percolation threshold necessary for electrical conductivity may be reduced from 17% v/v to 1% v/v, or sometimes even lower content, depending on the aspect ratio of the fibrils. Higher aspect ratios permit even lower percolation thresholds.

Thus, conductive particles of high aspect ratios are desirable; and a need exists for economical methods to make solid polyanilines of high crystallinity, controlled particle morphology and ordered molecular orientation.

SUMMARY OF THE INVENTION

One embodiment of the present invention is a method of forming an electrically conductive polyaniline which includes forming an emulsion comprising a polar liquid, a non-polar or weakly polar liquid that is immiscible with the polar liquid, at least one aniline, and at least one protonic acid; and adding an oxidant to the emulsion which causes the aniline to polymerize.

Another embodiment of the present invention is a method of producing electrically conducting polymers of aniline, in which an emulsion is formed from at least one non-polar or weakly polar organic liquid comprising 1–99% by weight of the emulsion; a polar liquid that is not miscible with said non-polar or weakly polar liquid and that constitutes 1–99% by weight of the emulsion; at least one aniline selected from unsubstituted anilines, substituted anilines and mixtures thereof; and at least one protonic acid solute, in which the counter-ion has been selected for its ability to simultaneously or independently perform two functions. The counter-ion emulsifies the emulsion and forms an electrically conducting complex with the polyaniline such that the complex has an electrical conductivity of at least $10^{-5}$ S/cm. The emulsion is then contacted with an oxidant.

Still another embodiment of the present invention is a method of forming an electrically conductive polyaniline which comprises three steps. The first step is preparing a first mixture including a non-polar or weakly polar liquid, at least one aniline, and at least one functionalized protonic acid. The second step is preparing a second mixture which includes a polar liquid that does not dissolve the non-polar or weakly polar liquid and an oxidant. The third step is combining the first mixture with the second mixture to form an emulsion in which the aniline polymerizes with the functionalized protonic acid to form an electrically conductive polyaniline.

Thus, this invention provides a cost efficient, versatile method to make highly conductive, polyaniline solids of controlled particle shape. The solid products of this invention differ from prior art polyanilines in that they are characterized by a high conductivity, high degree of crystallinity and orientation, and have a useful particle shape, such as fibrils of a high aspect ratio.

Additional objects, advantages and novel features of the present invention will be set forth, in part, in the description which follows and which will become apparent to those skilled in the art on examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
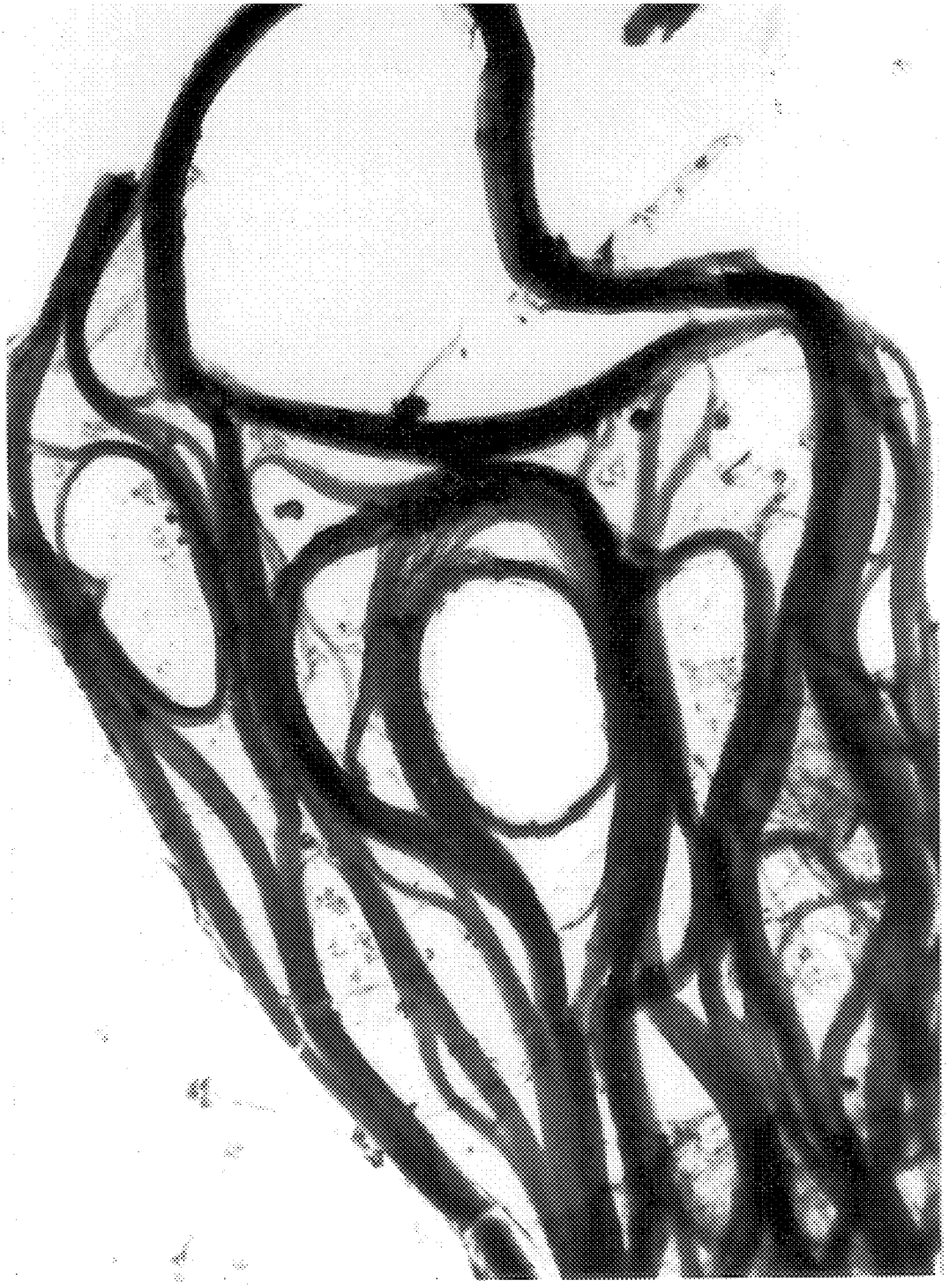
FIG. 1 is a transmission electron micrograph of the fibrillar particles of the polyaniline-dodecylbenzene sulfonic acid complex prepared in Example 12.

The present invention relates to a chemical oxidative method for making homopolymers and copolymers of substituted or unsubstituted aniline by emulsion polymerization. The general principles of emulsion polymerization are well known and cited in, for example, Bovey, F. A. Kolthoff, I. M., Medalia, A. I. and Meehan, E. J., Emulsion Polymerization, Interscience Publishers, New York, 1955; Odian, G., Principles of Polymerization, 2nd ed., John Wiley, New York, Chapter 4, "Emulsion Polymerization", p. 319. The current method involves polymerization of monomers provided in an emulsion.

This method of emulsion polymerization has several distinct advantages. In contrast to the commonly employed aqueous suspension polymerization of aniline, the emulsion polymerization method of the present invention involves a thermodynamically stable phase, which reduces the need for controlled stirring. The products of emulsion polymerizations can in some instances be employed without further separation, for applications in coatings, finishes, paints, inks and the like, or in blends with other components. Another advantage of the emulsion polymerization of the present invention is that the emulsifier does double duty because it also forms an electrically conductive complex with the polyanilines. Therefore, unlike in prior emulsion polymerizations, there is no need to remove the emulsifier from the emulsion polymerization mixture formed by the present method, nor is there a need for additional doping of the polyaniline after it is synthesized.

Typically, the emulsion polymerization of the present invention is carried out in mixtures which comprise the following components: i) one or more monomers; ii) polar liquid or dispersant, which normally is water; iii) functionalized protonic acid which acts as both emulsifier and dopant; iv) non-polar or weakly polar liquid; and v) a soluble initiator. These, and other components, such as plasticizing agents and other additives, may also be used in the emulsion polymerization of this invention.

It is well known in the art that protonic acids form electrically conductive complexes with the emeraldine base form of polyaniline. Typical examples of such disclosed protonic acids are HCl, $H_2SO_4$, sulfonic acids of the type $R_1$-$SO_3H$, phosphoric acids, boric acids, etc. Chiang, J.-C. and MacDiarmid, A. G., "Polyaniline: Protonic Acid Doping of the Emeraldine Form to the Metallic Regime", Synth. Metals, 13: 196, 1986; Salaneck, W. R. et al., "A Two-Dimensional-Surface "State" Diagram for Polyaniline", "Synth Metals, 13, 297, 1986. Such acids are added to polyaniline to form complexes with polyaniline, which exhibit electrical conductivities of $10^{-5}$ S/cm or more. In contrast, the current method provides for the addition of certain protonic acids directly to the above monomer ingredients of the emulsion, so that the polyaniline is obtained directly in its conducting form.

Particularly useful in the method of the present invention are functionalized protonic acids. As used herein, a "functionalized protonic acid" is a protonic acid generally denoted as H—(M—$R_p$), in which the counter-ion anionic species (M—$R_p$) contains $R_p$ which is a functional group or a connection to a polymer backbone which is chosen to form and stabilize the emulsion. Thus, preferred functionalized protonic acids in the method of the present invention are selected to simultaneously or independently i) form a conductive complex with the polyanilines; and ii) form and stabilize the emulsion. Surprisingly, it was discovered that the method of the present invention yields highly crystalline polyanilines of high conductivity and of controlled particle morphology that can be tailored to suit specific needs.

The method of this invention involves emulsion polymerization of homopolymers or copolymers of substituted or unsubstituted anilines and mixtures thereof. The emulsion is formed with four types of ingredients.

At least one substituted or unsubstituted anilines;

ii) A polar liquid which is the dispersant phase of the emulsion. This is normally water, or optionally can be any other polar liquid, or a mixture of polar liquids;

iii) A non-polar or weakly polar liquid. This can be an organic liquid or a mixture of two or more liquids. It does not dissolve in (is not miscible with) the polar dispersant phase of ii);

iv) At least one functionalized protonic acid which is capable of simultaneously or independently emulsifying the liquids of ii) and iii) and of forming a complex with polyanilines to produce a conductivity that is equal to or greater than about $10^{-5}$ S/m.

The second step of the method comprises contacting this emulsion with an oxidizing agent which causes the aniline to polymerize.

The Aniline

One ingredient in the method of the present invention is substituted or unsubstituted aniline. When the term "aniline" is used herein, it is used generically to include substituted and unsubstituted anilines, unless the context is clear that only the specific nonsubstituted form is intended. In general, anilines for use in the invention are monomers of the Formula I:

Formula I

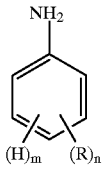

wherein m is an integer from 1 to 5;

n is an integer from 0 to 4, with the proviso that the sum of m and n is equal to 5; and R is independently selected so as to be the same or different at each occurrence and is selected from the group consisting of alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more sulfonic aid, carboxylic acid, halo, nitro, cyano or expoly moieties; or carboxylic acid, halogen, nitro, cyano, or sulfonic acid moieties; or any two R groups together may form an alkylene or alkenylene chain completing a 3, 4, 5, 6 or 7-membered aromatic or alicyclic ring, which ring may optionally include one or more divalent nitrogen, sulfur or oxygen atoms. Without intending to limit the scope of this invention, the size of the various R groups ranges from about 1 carbon (in the case of alkyl) through 2 or more carbons up through about 20 carbons with the total of n Rs being from about 1 to about 40 carbons.

Illustrative of the polyanilines useful in the practice of this invention are those of the Formula II to V:

II

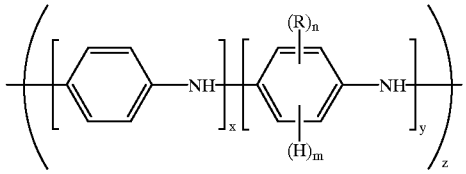

or

III

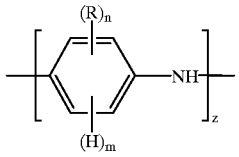

or

IV

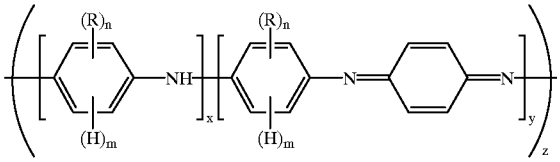

or

V

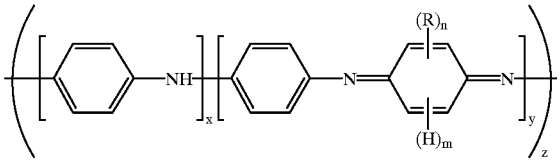

wherein:

n, m and R are as described above except that m is reduced by 1 as a hydrogen is replaced with a covalent bond in the polymerization and the sum of n plus m equals 4;

x is an integer equal to or greater than 1;

y is an integer equal to or greater than 0, with the proviso that the sum of x and y is greater than 1; and z is an integer equal to or greater than 1.

The following listing of substituted and unsubstituted anilines are illustrative of those which can be used to prepare polymers and copolymers useful in the practice of this invention.

| | |
|---|---|
| Aniline | 2,5-Dimethylaniline |
| o-Toluidine | 2,3-Dimethylaniline |
| m-Toluidine | 2,5-Dibutylaniline |

-continued

| | |
|---|---|
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thiomethylaniline |
| m-Hexylaniline | 2,5-Dichloroaniline |
| m-Octylaniline | 3-(n-Butanesulfonic acid) |
| 4-Bromoaniline | aniline |
| 2-Bromoaniline | |
| 3-Bromoaniline | 2,4-Dimethoxyaniline |
| 3-Acetamidoaniline | 4-Mercaptoaniline |
| 3-Acetamidoaniline | 4-Methylthioaniline |
| 5-Chloro-2-methoxyaniline | 3-Phenoxyaniline |
| 5-Chloro-2-ethoxyaniline | 4-Phenoxyaniline |

Illustrative of useful R groups are alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethoxy, octoxy, and the like, cycloalkenyl such as cyclohexenyl, cyclopentenyl and the like; alkanoyl such as butanoyl, pentanoyl, octanoyl, ethanoyl, propanoyl and the like; alkylsulfinyl, alkysulfonyl, alkylthio, arylsulfonyl, arylsulfinyl, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, naphthylthio and the like; alkoxycarbonyl such as methoxycarbonyl, ethoxycarbonyl, butoxycarbonyl and the like, cycloalkyl such as cyclohexyl, cyclopentyl, cyclooctyl, cycloheptyl and the like, alkoxyalkyl such as methoxymethyl, ethoxymethyl, butoxymethyl, propoxyethyl, pentoxybutyl and the like; aryloxyalkyl and aryloxyaryl such as phenoxyphenyl, phenoxymethylene and the like; and various substituted alkyl and aryl groups such as 1-hydroxybutyl, 1-aminobutyl, 1-hydroxylpropyl, 1-hydyroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; sulfonic acid terminated alkyl and aryl groups and carboxylic acid terminated alkyl and aryl groups such as ethylsulfonic acid, propylsulfonic acid, butylsulfonic acid, phenylsulfonic acid, and the corresponding carboxylic acids.

Also illustrative of useful R groups are divalent moleties formed from any two R groups such as moieties of the formula:

$$—(CH_2)—_n.$$

wherein n* is an integer from about 3 to about 7, as for example $—(CH_2)—_4$, $—(CH_2)—_3$ and $—(CH_2)—_5$, or such moieties which optionally include heteroatoms of oxygen and sulfur such as $—CH_2SCH_2—$ and $—CH_2—O—CH_2—$. Exemplary of other useful R groups are divalent alkenylene chains including 1 to about 3 conjugated double bond unsaturation such as divalent 1,3-butadiene and like moleties.

Preferred for use in the practice of this invention are polyanilines of the above Formulas II to V in which:

m is an integer from 2 to 4;

n is an integer from 0 to about 2, with the proviso that the sum of m and n is equal to 4;

R is alkyl or alkoxy having from 1 to about 12 carbon atoms, cyano, halogen, or alkyl substituted with carboxylic acid or sulfonic acid substituents;

x is an integer equal to or greater than 1;

y is an integer equal to or greater than 0, with the proviso that the sum of x and y is greater than about 4, and z is an integer equal to or greater than about 5.

Particularly preferred for use in the practice of this invention are polyanilines of the above Formulas II to V in which:

m is an integer from 2 to 4;

n is an integer from 0 to 2, with the proviso that the sum of m and n is equal to 4;

R is alkyl or alkoxy having from 1 to about 4 carbon atoms or alkyl substituted with carboxylic acid or sulfonic acid substituents;

x is an integer equal to or greater than 1;

y is an integer equal to or greater than 0, with the proviso that the sum of x and y is greater than about 6; and z is an integer equal to or greater than about 10.

Amongst the particularly preferred embodiments, most preferred for use in the practice of this invention are polyanilines of the above Formulas II to V in which:

m is an integer, 3 or 4;

n is an integer, 0 or 1, with the proviso that the sum of n and m is equal to 4;

R is alkyl or alkoxyl from 1 to about 4 carbon atoms;

x is an integer equal to or greater than 2;

y is an integer equal to or greater than about 8; and z is an integer equal to or greater than about 15.

In the most preferred embodiments of this invention, the polyaniline is derived from unsubstituted aniline, i.e., where n is 0 and m is 5 (monomer) or 4 (polymer).

The Polar Dispersant Phase

A second ingredient of the emulsions of the present invention is a polar dispersant phase. This can be water, any other polar liquid, or mixtures of polar liquids. Suitable polar liquids include, but are not limited to, alcohols such as methanol, ethanol, propanol, butanol, pentanol, hexanol, heptanol, octanol, decanol and glycol; aldehydes such as furfural; and ketones such as acetone and pentanone. More preferred are water, methanol and ethanol. The most preferred polar dispersant is water.

The Non-polar or Weakly Polar Liquid

A third ingredient of the emulsion of the present invention is a non-polar or weakly polar liquid, i.e., has a dielectric constant less than about 22. This can be an organic liquid or a mixture of two or more liquids. It is not miscible with the polar dispersant phase. Non-polar or weakly polar liquids which are useful in the present invention include, but are not limited to, alkanes and alkenes having from 5 to about 12 carbon atoms, mineral oil, aromatic hydrocarbons, halogenated aromatic hydrocarbons, halogenated alkanes and aliphatic alcohols, alkyl ethers and ketones having from 4 to about 12 carbon atoms, cycloalkanes, cycloalkenes, carbontetrachloride, carbon disulfide, chloroform, bromoform, dichloromethane, morpholine, alkylbenzenes, xylenes, toluene, decahydronaphthalene, styrene, and naphthalene.

Particularly preferred non-polar or weakly polar liquids for use in the present invention are alkanes and alkenes having from about 5 to 12 carbon atoms, mineral oil, aromatic hydrocarbons, halogenated aromatic hydrocarbons, halogenated alkanes and aliphatic alcohols, alkyl ethers and ketones having from 4 to about 12 carbon atoms, cycloalkanes, cycloalkenes, chloroform, alkylbenzenes, xylenes, toluene, decahydronaphthalene, and styrene.

Even more preferred non-polar or weakly polar liquids for use in the present invention are xylene, chloroform, toluene, decahydronaphthalene and trichlorobenzene.

The Functionalized Protonic Acid

A fourth ingredient of the emulsions of the present invention is one or more functionalized protonic acids in which the counter-ion(s) have been selected for their ability to simultaneously or independently perform these two functions: emulsify the polar liquid and the non-polar or weakly polar liquid and impart conductivity to the polyanilines formed.

AS used herein, a protonic acid is an acid that protonares polyaniline and forms a complex with polyaniline, such that the complex has a conductivity greater than about $10^{-5}$ S/cm. Preferred protonic acids form polyaniline complexes with electrical conductivity greater than about $10^{-3}$ S/cm, and particularly preferred protonic acids are those that form polyaniline complexes with a conductivity of greater than about 1 S/cm. Most preferred are those embodiments in which said polyaniline complex has a conductivity of greater than 10 S/cm.

Protonic acids have been used as dopants in the conductive polymer art as shown by the reference to J.-C. Chiang and Alan G. MacDiarmid; and the reference to W. R. Salaneck et al., noted above; but dopants do not necessarily emulsify polar and non-polar or weakly polar liquids. In contrast, the functionalized protonic acid used herein is an acid that not only protonares and complexes with polyaniline to form a complex whose conductivity is equal to or greater than about $10^{-5}$ S/cm, but also emulsifies non-miscible polar liquids and non-polar or weakly polar liquids.

If so desired, more than one functionalized protonic acid can be used to provide these functions. For example, in the case where one functionalized protonic acid provides a highly stable emulsion but imparts relatively low electrical conductivity to the polyaniline complex, that acid can be combined with another functionalized protonic acid which provides a very high conductivity to the overall composition.

The oxidant

In the method of the present invention, the emulsion containing substituted or unsubstituted aniline(s) is contacted with an oxidant which causes the aniline to polymerize. The choice of oxidant is not critical, provided that its oxidation potential is higher than the oxidation potential of the aniline monomers in the emulsion. Oxidants which are useful in the present invention include, but are not limited to, peroxysulfates, periodares, perchlorates, chromates and dichromates, permanganates, peroxides and the like. Preferably, the oxidant is selected from peroxysulfates, dichromates and peroxides, among which the most preferred are ammonium peroxysulfate, potassium dichromate, hydrogen peroxide and benzoyl peroxide. The most preferred oxidant is ammonium peroxysulfate.

Overall Compositions

The proportions of the ingredients in the emulsion polymerization of the present invention are not critical and may vary widely.

Typically, the emulsions of this invention include aniline or substituted aniline and mixtures thereof, a polar dispersant liquid, preferably water, a non-polar or weakly polar liquid and one or more functionalized protonic acids. The relative proportions of these materials can range as follows.

| | |
|---|---|
| Aniline | 1 part by weight |
| Polar dispersant liquid | From at least 0.1 to about 200 parts by weight |
| Non-polar or weakly polar liquid | From at least 0.1 to about 200 parts by weight |
| Protonic acid(s) | From at least 0.1 to about 50 parts by weight |
| Oxidant | From at least 0.1 to about 5 mole per mole of aniline |

In addition to the unsubstituted or substituted aniline(s), a polar dispersant liquid, a non-polar or weakly polar liquid and one or more functionalized protonic acids, the emulsions used in this invention can include other optional ingredients which may or may not dissolve in the composition. The nature of such optional ingredients can vary widely, and include those materials which are known to those of skill in the art for inclusion in polymer articles. The total of other materials that can be present is 98% or more of the total mixture, and being optional can be omitted altogether. Usually, for commercially attractive products these added ingredients may make up about 2% to 90% by weight of the total final product.

After the emulsion is prepared, the next step is contacting the oxidant with the emulsion. The particular method of contact is not critical and will vary widely depending on the oxidant used. A preferable way of the oxidant contacting the emulsion is dissolving or dispersing the oxidant in a polar dispersant liquid. The oxidant is added to the emulsion is done in such a way as to minimize the effect of exothermal heating of the emulsion. For example, the emulsion may be maintained in an ice bath, and the oxidant added gradually over a period of time.

The polymerization time and temperature can vary widely. For example, depending on the particular ingredients and temperature, the polymerization time can vary from about 30 minutes to about 100 hours. Preferably, the polymerization time will range from 1 to 48 hours. Even more preferably, polymerization time will range from 2 to 24 hours.

Polymerization temperature can vary, depending on the particular ingredients and temperature, but should preferably be in the range of −30° to +60° C. More preferably, the polymerization temperature ranges from −20° to +25° C. Most preferably, the polymerization temperature is maintained in the range of −10° to +50° C.

The method of the present invention provides polyanilines that are crystalline, highly conductive and may have a useful particle morphology. These solid, conductive polyanilines are useful per se or in blends with common non-conducting polymers. Illustrative of such useful common non-conducting polymers are polyethylenes; isotactic polypropylene; elastomers, such as styrene-butadiene-styrene (SBS) copolymers, polybutadiene, and the like; poly (vinylchloride), polystyrene; poly(vinylalcohol); poly (ethylene terephthalate); nylons, such as nylon 12, nylon 6.6, nylon 6 and the like; poly(methylmethacrylate), polycarbonate, acrylonitrile butene styrene copolymers, and the like. The polyaniline particles of the present invention can be blended with these non-conducting polymers by any useful means known to those skilled in the art of polymer compounding and blending. Method of blending include, but are not limited to, melt blending and kneading, solution blending, and the like.

It is also contemplated to use the polymerized polyaniline emulsions of the present method in such applications as inks, glues, coatings, paints, and the like. The polymerized polyaniline emulsion may also be used as either liquid conductors or liquid semiconductors, much in the same manner as liquid metals are used in various devices. Examples of such devices include gravity switches, fluid level detecting devices, other electrical or electronic switches and the like.

The higher the aspect ratio (length/diameter of microfibrils) of the inventive polyaniline complex, the lower is the percentage of polyaniline complex needed to conduct electricity in non-conductive polymer ingredients (percolation threshold). It is preferred that the inventive method produce an electrically conducting polyaniline-functionalized protonic acid complex having a microfibrillar morphology such that the aspect ratio of the microfibrils is at least about 5. More preferred is a polyaniline complex whose microfibrils have an aspect ratio of at least about 10. Even more preferred is a polyaniline complex whose microfibrils have an aspect ratio of at least about 50. Most preferred is a polyaniline complex whose microfibrils have an aspect ratio of at least about 100.

The following specific examples are presented to illustrate the invention and are not to be construed as limitations thereon.

EXAMPLE 1

A solution of 4.65 g (0.05M) of freshly distilled aniline (Aldrich) and 24.48 g (0.075M) of dodecylbenzene sulfonic acid (DBSA) (Tokyo Kasei) and 250 ml xylene (Curtin-Matheson) was prepared in a 250 ml Erlenmeyer flask. The flask was placed in a bath and maintained at 25° C. Polymerization was effected by the addition of an oxidant solution containing 4.68 g (0.02 M) of $(NH_4)2S_2O_8$ (Aldrich) in 20 ml distilled water. After all oxidant was added (over a period of 30 minutes), the flask was capped and stirring was continued for 24 hours. The molar ratio of oxidant to aniline was 0.4; the monomer concentration was 0.2M/1; and the ratio of DBSA to aniline was 1.5. A dark green mixture was formed.

The polymer emulsion was poured into 750 ml acetone and the polyaniline-dodecylbenzene sulfonic acid (PANI-DBSA) complex precipitated. This complex was recovered, filtered and washed three times with 150 ml acetone (Curtin-Matheson), three times with 150 ml distilled water, and again three times with 150 ml acetone. Finally the PANI-DBSA powder was dried in a vacuum desiccator for 48 hours at room temperature. The PANI-DBSA yield was 2.1 g. The molar ratio of DBSA to polymer repeat unit (PhN) in the powder was ~0.3.

This general example illustrates preparation of conductive polyaniline-functionalized protonic acid complexes directly from an emulsion containing the aniline monomer.

EXAMPLE 2

EXAMPLE 1 was repeated, but the polymerization temperature was changed to 0° C. and the polymerization time was changed to 96 hours.

Examples 3–6

Example 1 was repeated, but the molar ratio of DBSA to aniline was changed to 4.0, 3.0, 2.0 and 1.0.

EXAMPLES 7–10

Example 1 was repeated, but the polymerization solvent was changed to chloroform (Example 7), toluene (Example 8), decahydronaphthalene (Example 9) and 1,2,4-trichlorobenzene (Example 10) (all supplied by Aldrich).

EXAMPLE 11

Example 7 was repeated, but the polymerization temperature was lowered to 0° C.

For Examples 1–11, the yield (% w/w) of the above polymerizations was calculated from the ratio of the amount of emeraldine base, recovered after compensating with 3% $NH_4OH$ solution during 2 hours at room temperature, filtering, washing with distilled water, methanol (Curtin-Matheson), methyl ether (Aldrich) and finally drying at room temperature in dynamic vacuum for 48 hours, to the amount of initial aniline monomer concentration. The electrical conductivity of the PANI-DBSA complexes of examples 1–11 were determined by the usual four-probe method at room temperature on pressed pellets, as discussed in S. M. Sze, Physics of Semiconductor Devices, 2d Ed., Wiley & Sons, New York City (1981), pp. 30–35. The inherent viscosity (in dl/g) of the PANI-DBSA complex and of the emeraldine base obtained after compensation were determined at 25° C. in 97% $H_2SO_4$ (0.1% w/w polymer), using an Ubbelohde viscosimeter (Fisher Scientific). The results are presented in Tables 1–3.

TABLE 1

Effect of Polymerization Temperature

| Example # | Temperature (° C.) | Yield (%) | Conductivity (S/cm) | Viscosity (dl/g) salt | Viscosity (dl/g) base |
|---|---|---|---|---|---|
| 1 | 25 | 32.4 | 3.7 | 0.99 | 1.27 |
| 2 | 0 | 32.6 | 1.0 | 1.21 | 1.70 |
| 7 | 25 | 33.6 | 0.8 | 1.26 | 1.67 |
| 11 | 0 | 36.9 | 0.5 | 1.92 | 2.61 |

Significantly higher viscosities (reflecting large increases in molecular weight) were obtained at lower temperatures. Thus, the results in this table illustrate that it is beneficial to carry out the emulsion polymerization at lower temperatures; it also reveals that the direct preparation of PANI-DBSA complexes in organic solvents may lead to significantly higher molecular weights of the polymer as compared to the inherent viscosities achieved in acidic aqueous polymerizations, which often are in the range from 0.6–1.2 dl/g for the base.

TABLE 2

Effect of DBSA/Aniline Ratio

| Example # | DBSA/Aniline ratio | Yield (%) | Conductivity (S/cm) | Viscosity (dl/g) salt | Viscosity (dl/g) base |
|---|---|---|---|---|---|
| 3 | 4.0 | 27.2 | 0.4 | 0.38 | 0.61 |
| 4 | 3.0 | 37.0 | 0.2 | 0.21 | 0.93 |
| 5 | 2.0 | 34.0 | 0.2 | 0.24 | 0.45 |
| 1 | 1.5 | 32.4 | 3.7 | 0.99 | 1.27 |
| 6 | 1.2 | 32.6 | 0.7 | 0.48 | 0.68 |

Table 2 summarizes the effect of DBSA/aniline molar ratio on polymer yield, conductivity and viscosity of emulsion polymerized PANI-DBSA.

TABLE 3

Effect of Solvent

| Example # | Solvent | Yield (%) | Conductivity (S/cm) | Viscosity (dl/g) salt | Viscosity (dl/g) base |
|---|---|---|---|---|---|
| 1 | xylene | 32.4 | 3.7 | 0.99 | 1.27 |
| 7 | chloroform | 33.6 | 0.8 | 1.26 | 1.67 |
| 8 | toluene | 36.7 | 1.2 | 1.09 | 1.35 |
| 9 | decahydro-naphthalene | 36.8 | 0.1 | 1.07 | 1.18 |
| 10 | trichloro-benzene | 33.3 | 2.0 | 0.81 | 1.07 |

Table 3 illustrates that PANI-DBSA complexes can be emulsion polymerized using a wide variety of non-polar or weakly polar organic solvents.

EXAMPLE 12

A solution of 2.28 ml (0.025M) of aniline (Aldrich) and 12.24 g (0.0375M) of DBSA and 125 ml xylene was prepared in a 250 ml Erlenmeyer flask. The molar ratio of DBSA to aniline was 1.5. The flask was maintained at 25° C., and ca. 2 ml 1,2,4-trichlorobenzene was added as an internal standard. Polymerization was initiated by the addition of 2.34 g (0.01M) of $(NH_4)_2S_2O_8$ in 20 ml distilled water all at once whereby a white emulsion resulted that slowly turned to a dark green color. After two, four, six and eight hours of polymerization, respectively, 0.58 g (0.025M) of $(NH_4)_2S_2O_8$ in 5 ml of water was added to the emulsion to give a total molar ratio of oxidant to aniline of 0.8. The total polymerization time was 24 hours.

The free aniline concentration in the emulsion was measured by periodically withdrawing 1 ml of the emulsion from the polymerization reactor and precipitating it into a saturated aqueous solution of $Na_2CO_3$ (Aldrich). After filtration through solid $Na_2CO_3$ powder, the resulting clear solution was injected into a gas chromatograph and the relative aniline concentration calculated from the peak area relative to the peak area of the internal standard.

After 24 hours of polymerization, 90% of the aniline had been consumed, in contrast to Example 1 in which only 60% was consumed during 24 hours. The viscous emulsion was poured into 500 ml of acetone and the PANI-DBSA complex precipitated. The washing of the complex was done as in Example 1. The yield of the complex was 2.1 g which is twice the amount of the yield in Example 1 using the same amount of aniline. The inherent viscosity of the PANI-DBSA complex were determined at 25° C. in 97% $H_2SO_4$ (0.1% w/w polymer) and found to be 0.81 dl/g. The electrical conductivity of the complex was 0.8 S/cm, as measured by the usual two probe method on a pressed pellet of the complex.

Figure 2:
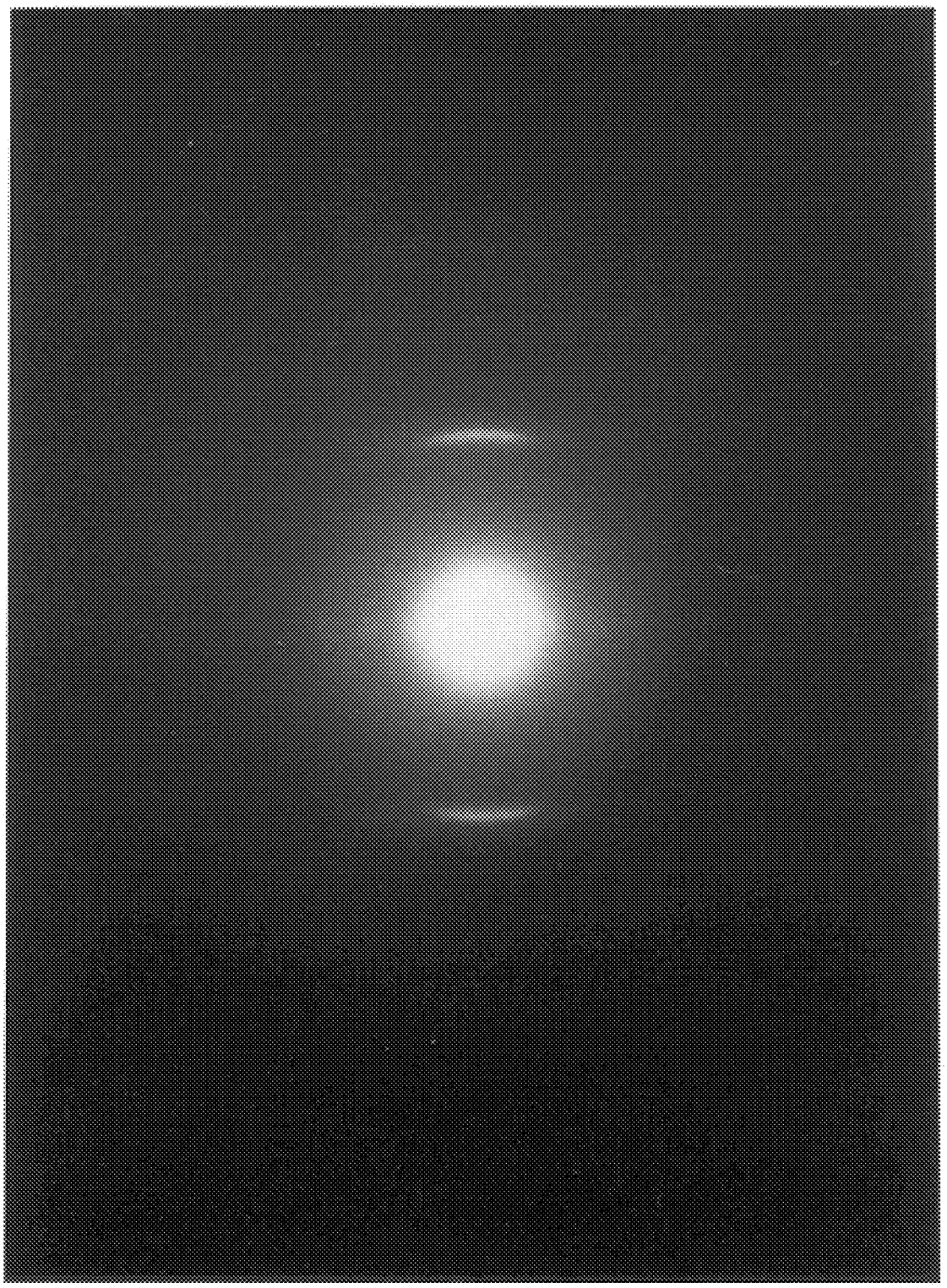
FIG. 2 is an electron diffraction pattern of the fibrillar particles of the polyaniline-dodecylbenzene sulfonic acid complex prepared in Example 12, revealing the exceptional degree of crystalline order and orientation of the polyaniline chain molecules along the direction of the particles.

The PANI-DBSA complex produced according to this example had a fibrillar morphology in sharp contrast to the globular morphologies normally seen in aqueous polymerization of aniline. FIG. 1 is a transmission electron micrograph of the fibrillar particles of the PANI-DBSA complex. The aspect ratio, or length to diameter ratio, of the fibrils was estimated to exceed 100. FIG. 2 is an electron diffraction pattern of the fibrillar particles of the PANI-DBSA complex, revealing the exceptional degree of crystalline order and orientation of the polyaniline chain molecules along the direction of the particles.

This example demonstrates that by controlled addition of oxidant, the polymerization can be brought to essentially complete conversion.

This example further illustrates that with this emulsion polymerization method, unique morphologies of the resulting polymer are achieved.

The fibrillar PANI-DBSA particles prepared as above were suspended in ethanol. The suspension was cast onto a glass plate, and the solvent was allowed to evaporate at ambient to yield a paper-like film. The electrical conductivity as measured by the four-point probe method was 160 S/cm.

EXAMPLE 13

A solution of 12.24 g (0.131M) aniline (Aldrich), 60 g DBSA (0.184M) and 40 g of xylene was prepared in an 250 ml Erlenmeyer flask under cooling in an ice bath. 29.89 g $(NH_4)_2S_2O_8$ in 40 ml of distilled water was gradually added during 2 hours so that the temperature of the emulsion was kept below 5° C. After all oxidant was added, the flask was capped and stirring was continued for an additional 2 hours. The resulting very viscous emulsion was poured into acetone, and the PANI-DBSA complex precipitated. The complex was wash as in Example 1. The yield of the PANI-DBSA complex was 17.65 g. The molar ratio of oxidant to aniline was 1.0, and the molar ratio DBSA to aniline was 1.4. The DBSA/PhN ratio in the powder was ~0.27; the inherent viscosity was 0.52 dl/g, and the electrical conductivity as measured by the four probe method on a pressed pellet was 1.7 S/cm.

This example illustrates that starting with emulsions with high concentrations of aniline monomer and surfactant, PANI-DBSA complexes can be obtained in industrially important yields having acceptable molecular weights and electrical conductivities.

EXAMPLE 14

A solution of 0.95 g (0.01M) aniline (Aldrich), 5.00 g DBSA (0.015M) and 10 g of xylene was prepared. To this solution was added 30 g of distilled water to form a viscous emulsion. Polymerization was initiated by the addition of 1.82 g (0.008M) of $(NH_4)_2S_2O_8$ in 10 g of distilled water so that the molar ratio of aniline to DBSA was 1.5 and the molar ratio of oxidant to aniline was 0.8. The polymerization was carried out during 6 hours at 25° C. The PANI-DBSA complex was precipitated, isolated and washed as in Example 1. The dried complex had a four-point probe conductivity of 0.68 S/cm and an inherent viscosity of 0.68 dl/g. The DBSA/PhN molar ratio was ~0.3.

This example illustrates that electrically conducting complexes of polyaniline can be prepared in water-rich emulsions containing aniline and an appropriate surfactant.

EXAMPLE 15

A solution of 5.37 g of O-toluidine (2-methylaniline) (Aldrich) and 24.48 g DBSA (molar ratio DBSA/O-toluidine of 1.5) and 250 ml xylene was prepared. The reaction vessel was kept at 25° C. and the polymerization was initiated by adding 6.07 g $(NH_4)_2S_2O_8$ (oxidant to aniline molar ratio of 0.54) in 20 ml of distilled water. An emulsion formed immediately and turned slowly dark green. After 6 hours of polymerization and after precipitation, washing and drying as described in Example 1, the yield was 2.66 g of poly(O-toluidine)-DBSA complex. This complex had an inherent viscosity of 0.289 dl/g and a conductivity of $3\times10^{-2}$ S/cm as measured by the usual four point method on a pressed pellet of the powder.

EXAMPLE 16

Example 15 was repeated but instead of O-toluidine, O-anisidine (2-methoxyaniline) was used as the monomer. The poly(O-anisidine)-DBSA complex obtained had an inherent viscosity of 0.267 dl/g and a conductivity of $7\times10^{-2}$ S/cm.

Examples 15 and 16 show that electrically conducting complexes of substituted polyanilines can be prepared using this emulsion polymerization methods.

EXAMPLE 17

Example 15 was repeated but instead of O-toluidine, a 1:1 molar mixture of aniline and O-toluidine was used. The resulting poly(aniline-co-O-toluidine)-DBSA complex had an inherent viscosity of 0.42 dl/g and a conductivity of $2\times10^{-2}$S/cm.

This example illustrates that co-polymers of aniline and substituted anilines can be prepared by this emulsion polymerization method.

EXAMPLE 18

Example 12 was repeated but instead of DBSA, octylsulphonic acid (OSA) was used as the functionalized protonic acid and emulsifier. OSA was prepared from the salt obtained from Aldrich. The resulting PANI-OSA complex had an inherent viscosity of 0.53 dl/g and a conductivity of 0.4 S/cm.

EXAMPLE 19

Example 12 was repeated but instead of DBSA, hexylsulphonic acid (HSA) was used as the functionalized protonic acid and emulsifier. HSA was prepared from the salt obtained from Aldrich. The resulting PANI-HSA complex had an inherent viscosity of 0.67 dl/g and a conductivity of 0.2 S/cm.

Examples 18 and 19 demonstrate that, generally, any functionalized protonic acid that simultaneously functions 1) to protonate the emeraldine base form of polyaniline to convert it into the corresponding electrically conducting complex, and 2) to emulsify the mixture may be used.

EXAMPLE 20

The PANI-DBSA complex of Example 13 with a DBSA/PhN molar ratio of ~0.27 was mixed with additional DBSA to give a complex with DBSA/PhN molar ratio of ~1.1. The complex could be dissolved in xylene to give solutions containing up to 20% w/w. The solubility of the corresponding complex obtained by mechanically mixing the emeraldine base form of polyaniline, of similar molecular weight, with the same amount of DBSA gave a PANI-DBSA complex with a solubility in xylene of 8% w/w.

This example demonstrates, that in-situ, emulsion-polymerized polyaniline-functionalized protonic acid complexes have higher solubilities in non-polar organic solvents than corresponding complexes obtained by mechanically mixing the emeraldine base form of polyaniline with the functionalized protonic acid. This is believed to be due to more homogeneous protonation of polyaniline by this emulsion polymerization method.

EXAMPLE 21

The solution prepared in Example 20 was cast onto a glass plate and the xylene was evaporated at ambient conditions. The electrical conductivity as measured by the four-point probe method was 110 S/cm.

We claim:

1. A method of forming an electrically conductive microfibrillar polyaniline which comprises the steps of:

a. forming an emulsion comprising
   (i) a polar liquid,
   (ii) a non-polar or weakly polar liquid that is immiscible with said polar liquid,
   (iii) at least one aniline, and
   (iv) at least one functionalized protonic acid which protonates and forms a complex with the aniline and which functionalized protonic acid emulsifies the polar liquid and the non-polar or weakly polar liquid; and b. adding an oxidant to said emulsion to cause said aniline to polymerize.

2. The method of claim 1 wherein the polar liquid is water.

3. The method of claim 1 wherein the aniline is substituted aniline, unsubstituted aniline or a mixture thereof.

4. The method of claim 3 wherein the aniline has the following formula:

I

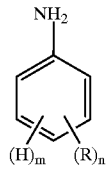

wherein:

n is an integer from 0 to 4;

m is an integer from 1 to 5 with the proviso that the sum of n and m is equal to 5; and R is independently selected so as to be the same or different at each occurrence and is selected from the group consisting of alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more sulfonic aid, carboxylic acid, halo, nitro, cyano or expoly moleties; or carboxylic acid, halogen, nitro, cyano, or sulfonic acid moieties; or any two R groups together may form an alkylene or alkenylene chain completing a 3, 4, 5, 6 or 7-membered aromatic or alicyclic ring, which ring may optionally include one or more divalent nitrogen, sulfur or oxygen atoms.

5. The method of claim 4 wherein n is 0 and m is 5.

6. The method of claim 1 wherein said electrically conductive polyaniline has one of the following structures:

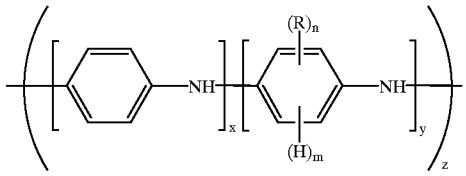

-continued

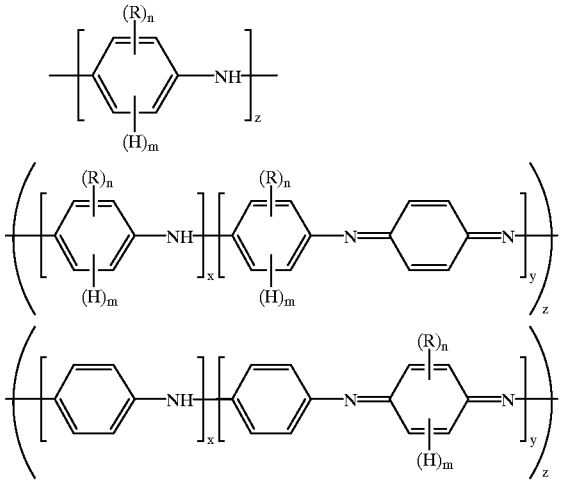

wherein:

n is an integer from 0 to 4;

m is an integer from 1 to 4 and the sum of n plus m equals 4;

R is independently selected so as to be the same or different at each occurrence and is selected from the group consisting of alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more sulfonic aid, carboxylic acid, halo, nitro, cyano or expoly moleties; or carboxylic acid, halogen, nitro, cyano, or sulfonic acid moieties; or any two R groups together may form an alkylene or alkenylene chain completing a 3, 4, 5, 6 or 7-membered aromatic or alicyclic ring, which ring may optionally include one or more divalent nitrogen, sulfur or oxygen atoms;

x is an integer equal to or greater than 1;

y is an integer equal to or greater than 0, with the proviso that the sum of x and y is greater than 1; and z is an integer equal to or greater than 1.

7. The method of claim 6 wherein n is an integer from 0 to about 2;

m is an integer from 2 to 4, with the proviso that the sum of n and m is equal to 4;

R is alkyl or alkoxy having from 1 to about 12 carbon atoms, cyano, halogen, or alkyl substituted with carboxylic acid or sulfonic acid substituents;

x is an integer equal to or greater than 1;

y is an integer equal to or greater than 0, with the proviso that the sum of x and y is greater than about 4, and z is an integer equal to or greater than about 5.

8. The method of claim 7 wherein the sum of n and m is equal to 4;

R is alkyl or alkoxy having from 1 to about 4 carbon atoms or alkyl substituted with carboxylic acid or sulfonic acid substituents;

the sum of x and y is greater than about 6; and z is an integer equal to or greater than about 10.

9. The method of claim 6 in which:

n is 0 or 1;

m is 3 or 4, with the proviso that the sum of n and m equals 4;

R is alkyl or alkoxy from 1 to about 4 carbon atoms;

x is an integer equal to or greater than 2;

y is an integer equal to or greater than 1, with the proviso that the sum of x and y is greater than about 8; and z is an integer equal to or greater than about 15.

10. The method of claim 6 wherein n is 0 and m is 4.

11. The method of claim 1 wherein the emulsion of (a) further comprises one or more emulsifiers.

12. The method of claim 1 further comprising, after permitting the aniline to polymerize, the step of removing said polar and/or non-polar or weakly polar liquids.

13. The method of claim 1 wherein the functionalized protonic acid performs the dual functions of emulsifying the polar and non-polar liquids and of protonating/complexing with polyaniline.

14. The method of claim 1 wherein the electrically conductive polyaniline has a microfibrillar morphology such that the aspect ratio of the microfibrils is at least about 5.

15. The method of claim 1 wherein the electrically conductive polyaniline has a microfibrillar morphology such that the aspect ratio of the microfibrils is at least about 10.

16. The method of claim 1 wherein the electrically conductive polyaniline has a microfibrillar morphology such that the aspect ratio of the microfibrils is at least about 50.

17. The method of claim 1 wherein the electrically conductive polyaniline has a microfibrillar morphology such that the aspect ratio of the microfibrils is at least about 100.

18. A method of producing electrically conducting microfibrillar polymers of aniline, said method comprising a. forming an emulsion comprising (i) at least one non-polar or weakly polar organic liquid comprising 1–99% by weight of the emulsion;

(ii) a polar liquid that is not miscible with said non-polar or weakly polar liquid and that constitutes 1–99% by weight of the emulsion;

(iii) at least one aniline selected from unsubstituted anilines, substituted anilines and mixtures thereof;

(iv) at least one protonic acid solute, in which the counter-ion has been selected for its ability to simultaneously or independently:

(A) emulsify said emulsion; and (B) form an electrically conducting complex with the polyaniline, said complex having an electrical conductivity of at least $10^{-5}$ S/cm; and v. one or more additional emulsifiers, and b. contacting said emulsion with an oxidant.

19. The method of claim 18 wherein the aniline polymer is a homopolymer or co-polymer.

20. The method of claim 18 wherein the electrically conducting complex has a conductivity of at least $10^{-3}$ S/cm.

21. The method of claim 18 wherein the electrically conducting complex has a conductivity of at least $10^{=31\ 1}$ S/cm.

22. The method of claim 18 wherein the electrically conducting complex has an inherent viscosity of at least 1.2 dl/g.

23. The method of claim 18 wherein the electrically conducting complex has an inherent viscosity of at least 2.0 dl/g.

*24. The method of producing electrically conducting microfibrillar polymers of aniline according to claim 18, said method comprising*

*a. forming an emulsion comprising*

*(i) at least one non-polar or weakly polar organic liquid comprising 1–99% by weight of the emulsion,*

*wherein the non-polar or weakly polar liquid comprising an aliphatic alcohol;*

(*ii*) *a polar liquid that is not miscible with said non-polar or weakly polar liquid and that constitutes 1–99% by weight of the emulsion, wherein said polar liquid is water;*

(*iii*) *at least one aniline selected from unsubstituted anilines, substituted anilines and mixtures thereof, wherein the aniline has the following formula:*

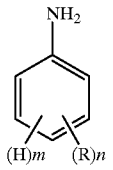

*wherein*

*n is an integer from 0 to 4;*

*m is an integer from 1 to 5 with the proviso that the sum of n and m is equal to 5; and*

*R is independently selected so as to be the same or different at each occurrence and is selected from the group consisting of alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more sulfonic acid, carboxylic acid, halo, nitro, cyano, or epoxy moieties; or carboxylic acid, halogen, nitro, cyano, or sulfonic acid moieties; or any two R groups together may form an alkylene or alkenylene chain completing a 3, 4, 5, 6 or 7-membered aromatic or alicyclic ring, which ring may optionally include one or more divalent nitrogen, sulfur or oxygen atoms;*

(*iv*) *at least one protonic acid solute, in which the counter-ion has been selected for its ability to simultaneously or independently;*

(*A*) *emulsify said emulsion; and*

(*B*) *form an electrically conducting complex with the polyaniline said complex having an electrical conductivity of at least* $10^{-5}$ S/cm; and (*v*) *one or more additional emulsifiers, and*

*b. contacting said emulsion with an oxidant.*

*25. The method of claim 18 wherein the non-polar or weakly polar liquid has a dielectric constant less than about 22.*

*26. The method of claim 25 wherein the non-polar or weakly polar liquid is selected from the group consisting of alkanes and alkenes having from 5 to about 12 carbon atoms, mineral oil, aromatic hydrocarbons, halogenated aromatic hydrocarbons, halogenated alkanes, aliphatic alcohols, alkyl ethers and ketones having from 4 to about 12 carbon atoms, cycloalkanes, cycloalkenes, carbon tetrachloride, carbon disulfide, chloroform, bromoform, dichloromethane, morpholine, alkylbenzenes, xylenes, toluene, decahydronaphthalene, styrene, and naphthalene.*

*27. The method of claim 25 wherein the polar liquid is water.*

*28. The method of claim 25 wherein the non-polar or weakly polar liquid comprises an aliphatic alcohol.*

*29. The method of claim 25 wherein the non-polar or weakly polar liquid is an alkyl ether having from 4 to about 12 carbon atoms.*

*30. The method of claim 25 wherein the non-polar or weakly polar liquid is a ketone having from 4 to about 12 carbon atoms.*

*31. The method of claim 1 wherein the non-polar or weakly polar liquid has a dielectric constant less than about 22.*

*32. The method of claim 31 wherein the non-polar or weakly polar liquid is selected from the group consisting of alkanes and alkenes having from 5 to about 12 carbon atoms, mineral oil, aromatic hydrocarbons, halogenated aromatic hydrocarbons, halogenated alkanes, aliphatic alcohols, alkyl ethers and ketones having from 4 to about 12 carbon atoms, cycloalkanes, cycloalkenes, carbon tetrachloride, carbon disulfide, chloroform, bromoform, dichloromethane, morpholine, alkylbenzenes, xylenes, toluene, decahydronaphthalene, styrene, and naphthalene.*

*33. The method of claim 32 wherein the non-polar or weakly polar liquid is an aliphatic alcohol.*

*34. The method of claim 32 wherein the non-polar or weakly polar liquid is an alkyl ether having from 4 to about 12 carbon atoms.*

*35. The method of claim 32 wherein the non-polar or weakly polar liquid is a ketone having from 4 to about 12 carbon atoms.*

*36. The method of forming an electrically conductive microfibrillar polyaniline according to claim 1, which method comprises the steps of:*

*a. forming an emulsion comprising*

(*i*) *a polar liquid, wherein the polar liquid is water;*

(*ii*) *a non-polar or weakly polar liquid that is immiscible with said polar liquid, wherein the non-polar or weakly polar liquid has a dielectric constant less than about 22;*

(*iii*) *at least one aniline, wherein the aniline has the following formula:*

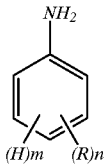

*wherein*

*n is an integer from 0 to 4;*

*m is an integer from 1 to 5 with the proviso that the sum of n and m is equal to 5; and*

*R is independently selected so as to be the same or different at each occurrence and is selected from the group consisting of alkyl, alkenyl, alkoxy, cycloalkyl, cycloalkenyl, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more sulfonic acid, carboxylic acid, halo, nitro, cyano, or epoxy moieties; or carboxylic acid, halogen, nitro, cyano, or sulfonic acid moieties; or any two R groups together may form an alkylene or alkenylene chain completing a 3, 4, 5, 6 or 7-membered aromatic or alicyclic ring, which ring may optionally include one or more divalent nitrogen, sulfur or oxygen atoms; and*

(*iv*) *at least one functionalized protonic acid which protonates and forms a complex with the aniline and*

*which functionalized protonic acid emulsifies the polar liquid and the non-polar or weakly polar liquid; and*

*b. adding an oxidant to said emulsion to cause said aniline to polymerize.*

*37. The method of forming an electrically conductive microfibrillar polyaniline according to claim 1, wherein the polar liquid is water, the nonpolar or weakly polar liquid comprises an aliphatic alcohol and the at least one aniline is a single aniline such that the method comprise the steps of:*

*a. forming an emulsion comprising*

(*i*) *water;*

(*ii*) *an aliphatic alcohol;*

(*iii*) *an aniline; and*

(*iv*) *at least one functionalized protonic acid which protonates and forms a complex with the aniline and which functionalized protonic acid emulsifies the water and the aliphatic alcohol; and*

*b. adding an oxidant to said emulsion to cause said aniline to polymerize.*

* * * * *